United States Patent [19]
Matsunaga

[11] Patent Number: 4,911,111
[45] Date of Patent: Mar. 27, 1990

[54] INTAKE MANIFOLD FOR AN INTERNAL COMBUSTION ENGINE

[75] Inventor: Toshihide Matsunaga, Saitama, Japan
[73] Assignee: Honda Giken Kogyo Kabushiki Kaisha, Tokyo, Japan
[21] Appl. No.: 339,194
[22] Filed: Apr. 14, 1989
[30] Foreign Application Priority Data
   Apr. 14, 1988 [JP] Japan .................... 63-92525
[51] Int. Cl.⁴ ............................................. F02M 35/10
[52] U.S. Cl. .......................... 123/52 MB; 123/188 M
[58] Field of Search ......... 123/52 M, 52 MC, 52 MB, 123/188 M

[56] References Cited
U.S. PATENT DOCUMENTS

| | | | |
|---|---|---|---|
| 3,491,733 | 1/1970 | Soubis | 123/52 M |
| 4,592,310 | 6/1986 | Hitomi et al. | |
| 4,643,136 | 2/1987 | Ura et al. | 123/52 M |
| 4,664,076 | 5/1987 | Miyano | |
| 4,726,329 | 2/1988 | Atkin | |

FOREIGN PATENT DOCUMENTS

| | | | |
|---|---|---|---|
| 0043923 | 3/1984 | Japan | 123/52 M |
| 59-82522 | 5/1984 | Japan | |
| 0173519 | 10/1984 | Japan | 123/52 M |

*Primary Examiner*—David A. Okonsky
*Attorney, Agent, or Firm*—Lyon & Lyon

[57] ABSTRACT

An intake manifold device for an internal combustion engine that has an engine body with an intake port connected to an intake valve port which is openable and closable by an intake valve operatively coupled to a valve operating mechanism capable of varying the intake valve operation between low and high speed operation. The intake port is connected to an intake chamber through a first intake passageway which has a length and a cross-sectional area for a low-speed range and through a selectively openable and closable second intake passageway which is openable in a high-speed range. Independently characterized in openable and closable on/off valve are disposed respectively in upstream and downstream ends of the second intake passageways. The on/off valves and intake valves operating mechanism are selectively operated for maximizing the torque output of the engine over a wide range of speeds.

13 Claims, 5 Drawing Sheets

INTAKE MANIFOLD FOR AN INTERNAL COMBUSTION ENGINE

The present invention relates to an intake manifold for an internal combustion engine and, in particular, to an intake manifold of the type that includes a first intake passage which has a length and a cross-sectional area that are selected for low-speed range of operation of the engine, a selectively openable and closable second intake passage which has a length and cross-sectional area that are selected for a high-speed range of operation of the engine.

Intake manifolds of this type are known from, for example, Japanese Laid-Open Patent Publication No. 59-82522 and U.S. Pat. Nos. 4,592,310, 4,664,076 and 4,726,329.

According to the known intake device of Japanese 59-82522, for example, a low-load intake passage corresponding to a low-speed range of operation of the engine and a high-load intake passage corresponding to a high-speed range of operation of the engine are connected to an intake port and the high-load intake passage is selectively openable and closable by an on/off valve disposed in an intermediate portion of the high-load intake passage in the direction in which air flows therethrough. When the on/off valve is closed in the low-speed range of the engine, therefore, a portion of the high-load intake passage which extends downstream of the on/off valve communicates with the low-load intake passage, thus creating a dead space from the on/off valve in the high-load intake passage to the down-stream end thereof. Such a dead space is responsible for unstable intake of air in the low-speed range of the engine and also for a reduction in the response of the engine to quick acceleration from a low engine rotational speed.

Moreover, that conventional intake manifold produces torque peaks only in the low- and high-speed ranges of the engine. More torque peaks are desirable in order to generate greater engine output power in a wider range of engine rotational speeds.

It is an object of the present invention to provide an intake manifold for an internal combustion engine, which minimizes the dead space produced in a downstream portion of a second intake passage in a low-speed range of operation of the engine to stabilize air intake in the low-speed range and maintain a desirable response of the engine to quick acceleration.

Another object of the present invention is to provide an intake manifold and system for an internal combustion engine which can generate multiple torque peaks to produce a greater engine output power in a wider range of engine rotational speeds.

According to a first feature of the present invention, two openable and closable on/off valves are disposed respectively in upstream and downstream ends of the second intake passageways of the manifold. When the on/off valve in the downstream end of the second intake passageway is closed, any dead space in the second intake passageway, the downstream end of which communicates with the first intake passageway, is minimized and the intake stability in the low-speed range and the response to quick acceleration from the low-speed range are maintained.

According to a second feature of the present invention, the two on/off valves in the second intake passageway are openable and closable independently of each other. By closing only the on/off valve in the upstream end of the second passageway, almost the entire second intake passageway communicates with the first intake passageway, thus varying the natural frequency of the first intake passageway to shift the position of a torque peak on a torque/speed curve. By closing only the on/off valve in the downstream end of the second intake passageway, almost the entire second intake passageway communicates with an intake chamber, thus varying the natural frequency of the intake chamber to shift the position of a torque peak on a torque/speed curve. Therefore, by opening and closing the on/off valves at different timings, many torque peaks can be produced by the engine for a higher engine output power in a wide range of engine rotational speeds.

According to a third feature of the present invention, in addition to the two passageways with valves in the manifold, the intake valve operating mechanism of the engine is selectively operable in a mode corresponding to a third rotational speed range which is a low-speed range different from the low-speed range at which the manifold second passageway valves are closed, and a mode corresponding to a fourth rotational speed range higher than the third rotational speed range and different from the high-speed range at which the manifold valves are open. By controlling the timings of opening and closing the on/off valves in the second intake passageway and the timing of switching the valve operating mechanism in combination, more torque peaks can be produced by the engine for a greater engine output power in a wider range of engine rotational speeds.

An embodiment of the present invention will hereinafter be described with reference to the drawings, wherein.

Figure 1:
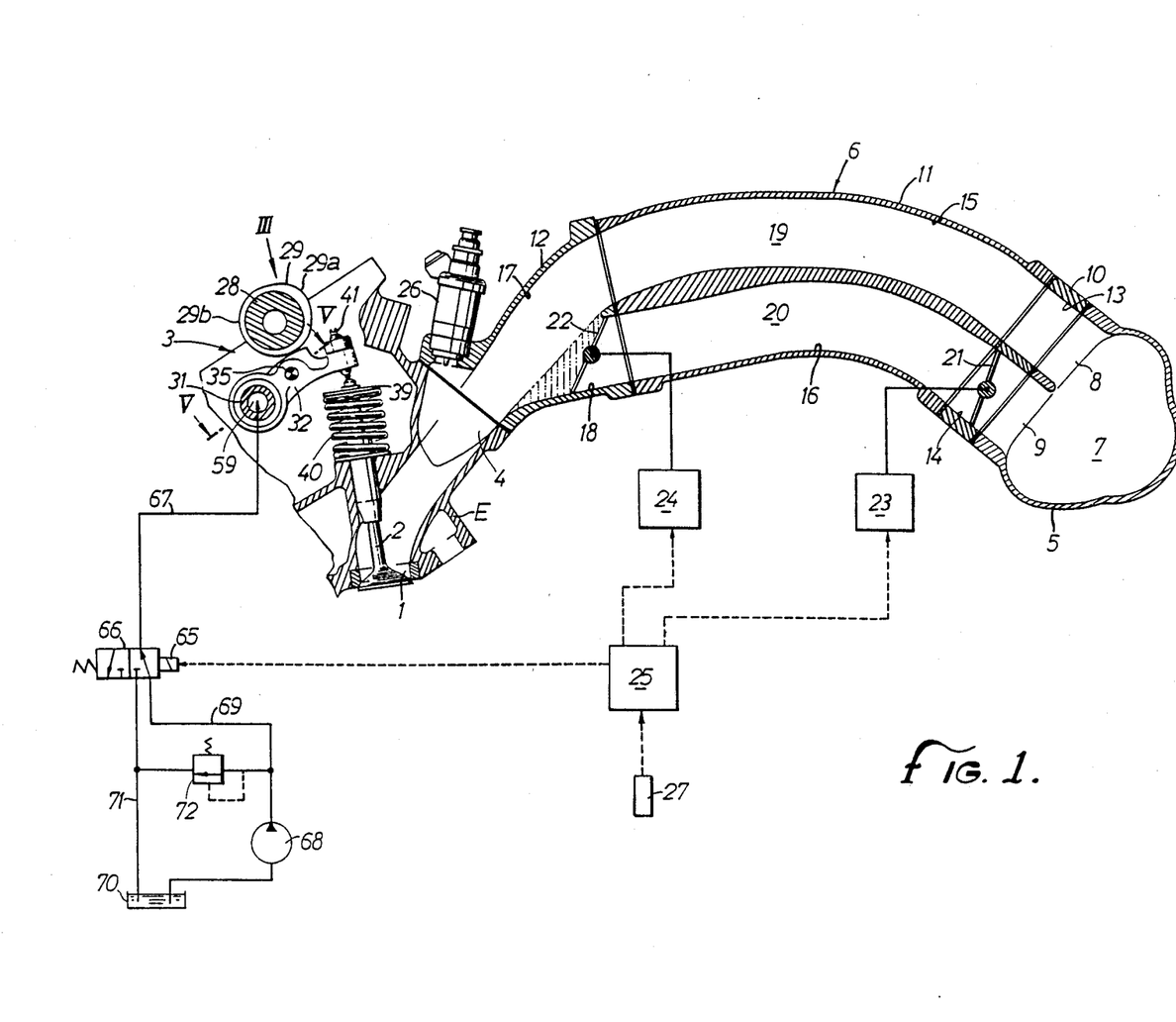
FIG. 1 is a cross-sectional elevation view of the intake manifold of this invention and the intake valve portion of the engine.

FIG. 1 shows an intake manifold system incorporated in a multicylinder internal combustion engine having a pair of intake manifold system incorporated in a multicylinder internal combustion engine having a pair of intake valve ports 1 (one shown) defined in an engine E at each engine cylinder. A pair of intake valves 2 (one shown) are disposed in the engine body E at each engine cylinder for opening and closing the respective intake valve ports 1 in response to operation of a valve operating mechanism 3. The engine body E has a plurality of intake ports 4 (one shown) defined therein and associated respectively with the engine cylinders, each of the intake ports 4 being connected in common to the pair of intake valve ports 1. The intake ports 4 are connected by an intake manifold 6 to a common intake casing 5 shared by the engine cylinders. The intake casing 5 is coupled to an air cleaner (not shown) through a throttle body (not shown) in a conventional manner.

The intake casing 5 defines therein an intake chamber 7 which is elongate along the array of the engine cylinders in the engine body E. The intake casing 5 has a pair of first and second outlet ports 8, 9 associated with each engine cylinder and connected to the intake manifold 6.

The intake manifold 6 comprises a first joint member 10, a passage member 11, and a second joint member 12 which are joined successively from the upstream end, i.e., the intake casing 5. The first joint member 10 is joined to the intake casing 5 and has a passage 13 communicating with the first outlet port 8 of the intake casing 5 and a passage 14 communicating with the second outlet port 9 of the intake casing 5, the passages 13, 14 being disposed adjacent to each other. The passage member 11 has a passage 15 communicating with the passage 13 and a passage 16 communicating with the passage 14 and disposed adjacent to the passage 15, the passages 15, 16 extending over a relatively large distance. The second joint member 12 is connected to the intake port 4 in the engine body E and has a passage 17 communicating between the intake port 4 and the passage 15 and a branch passage 18 joined between an intermediate portion of the passage 17 and the passage 16.

The intake manifold 6, and the intake casing 5 and the intake port 4 interconnected thereby, jointly provide a first intake passageway 19 extending from the first outlet port 8 through the passages 13, 15, 17 to the intake port 4. The first intake passageway 19 has a length and a cross-sectional area selected to obtain an optimum intake inertia effect in a first low-speed range A1 (see FIG. 2) of the engine, e.g., low to medium-speed ranges below a certain rotational speed N4. The intake manifold 6, the intake casing 5, and the intake port 4 also jointly provide a second intake passageway 20 extending from the second outlet port 9 through the passages 14, 16 and the branch passage 18 and connected to a downstream end of the first intake passageway 19. The second intake passageway 20 has a length and a cross-sectional area selected such that the first and second intake passageways 19, 20 combined together produce an optimum intake inertia effect in a second high-speed range A2 of the engine, e.g., a high-speed range exceeding the rotational speed N4.

A butterfly on/off valve 21 which is openable and closable by an actuator 23 is disposed in the upstream end of the second intake passageway 20, i.e., the passage 14 in the first joint member 10. Another butterfly on/off valve 22 which is openable and closable by an actuator 24 is disposed in the downstream end of the second intake passageway 20, i.e., the branch passage 18 in the second joint member 12. The on/off valve 22 is positioned such that when it is fully closed, it minimizes the volume of a hatched space indicated by two-dot-and-dash lines in FIG. 1 in order to avoid turbulences in the flow of intake air between the passage 19 of the first intake passageway 19 and the intake port 4, and when it is opened, it does not disturb the flows of intake air through the first and second intake passageways 19, 20. A fuel injection valve 26 is connected to the second joint member 12 for injecting a spray of fuel toward the intake port 4.

Figure 2:
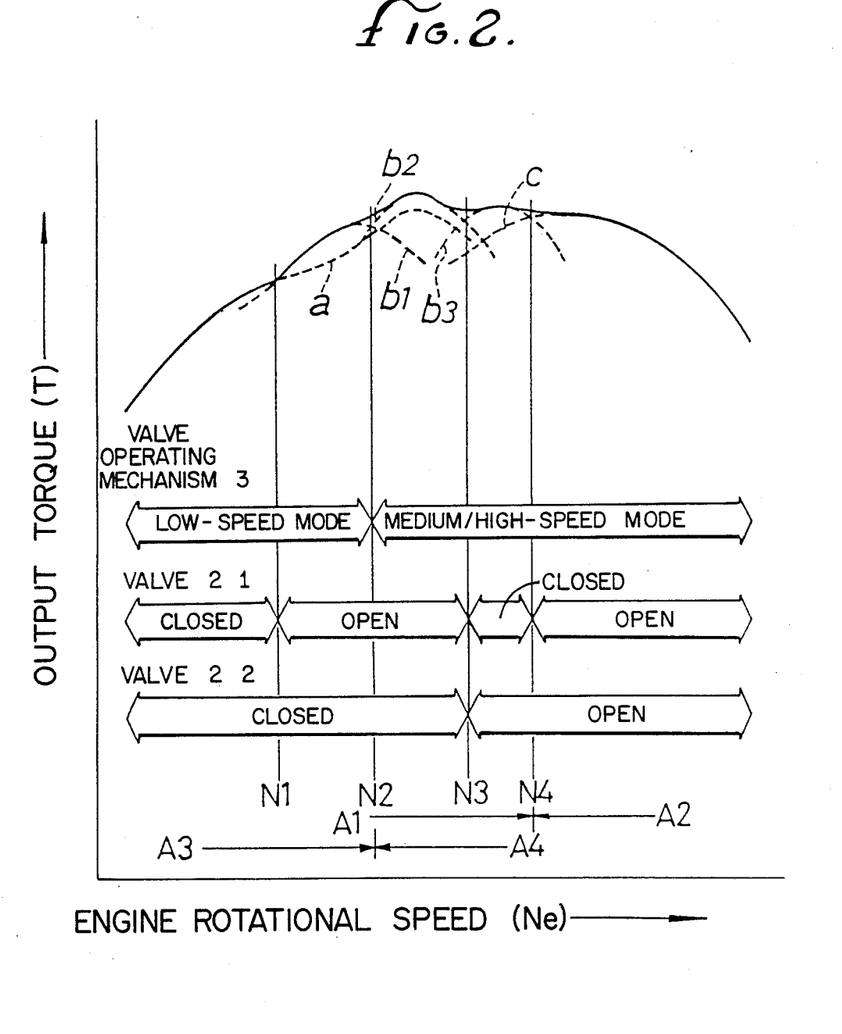
FIG. 2 is a graph showing output torque characteristics of this invention.

The actuators 23, 24 are independently controlled by a control means 25 such as a computer or the like. The control means 25 is responsive to the engine rotational speed as detected by a rotational speed detector 27 to individually control the operation of the actuators 23, 24 to control the on/off valves 21, 22 independently of each other. More specifically, as shown in FIG. 2, the on/off valve 21 is opened when the engine rotational speed is relatively low, i.e., when it exceeds a rotational speed N1 lower than the rotational speed N4, is closed when the engine rotational speed exceeds a rotational speed N3 higher than the rotational speed N1 and lower than the rotational speed N4, and is opened again when the engine rotational speed exceeds the rotational speed N4. The on/off valve 22 is opened when the engine rotational speed goes higher than the rotational speed N3 and is closed below of speed N3.

Figures 3, 4, 5:
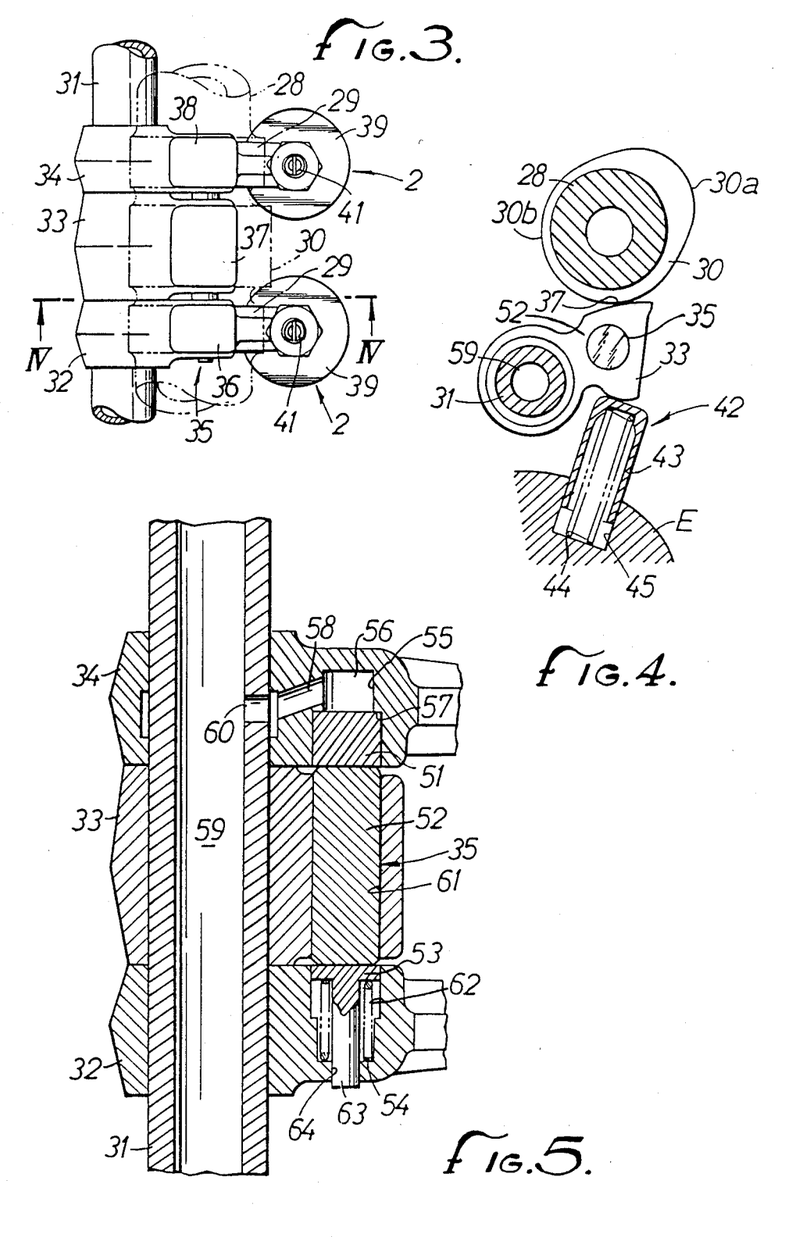
FIG. 3 is an enlarged view of the valve operating mechanism as viewed in the direction indicated by arrow III in FIG. 1.
FIG. 4 is a cross-sectional view taken along line IV—IV of FIG. 3.
FIG. 5 is an enlarged cross-sectional view taken along line V—V of FIG. 1.

As shown in FIGS. 3, 4, and 5, the valve operating mechanism 3 for opening and closing the pair of intake valves 2 comprises a camshaft 28 rotatable by the crankshaft (not shown) of the engine at a speed ratio of ½ with respect to the speed of rotation of the crankshaft, a pair of low-speed cams 29 and a high-speed cam 30 which are integrally formed on the camshaft 28, a rocker shaft 31 fixed to the engine body E and extending parallel to the camshaft 28, first, second, and third rocker arms 32, 33, 34 pivotally supported on the rocker shaft 31, and a valve operation mode changing mechanism 35 disposed between the rocker arms 32, 33, 34.

The camshaft 28 is rotatably disposed above the engine body E. The low-speed cams 29 are integrally formed with the camshaft 28 in alignment with the intake valves 2, respectively. The high-speed cam 30 is integrally formed with the camshaft 28 between the low-speed cams 29. The low-speed cams 29 serve to operate the intake valves in a lower-speed mode corresponding to a third rotational speed range A3 (see FIG. 2) which is a low-speed range and different from the first rotational speed range A1. The third rotational speed range A3 extends up to a second rotational speed N2 which is higher than the first rotational speed HI and lower than the third rotational speed N3. The high-speed cam 30 serves to operate the intake valves in a medium/high-speed mode corresponding to a fourth rotational speed range A4 (see FIG. 2) which is higher than the third rotational speed range A3 and different from the second rotational speed range A2. The fourth rotational speed range A4 extends above the second rotational speed N2. Each of the low-speed cams 29 has a cam lobe 29a (see FIG. 1) projecting radially outwardly to a relatively small extent and a base circle portion 29b having a constant radius. The high-speed cam 30 has a cam lobe 30a (see FIG. 4) projecting radially outwardly to a larger extent than the cam lobe 29a and having an angular extent larger than the cam lobe 29a, and a base circle portion 30b having a constant radius.

The first rocker shaft 31 which is operatively associated with one of the intake valves 2, the third rocker arm 34 which is operatively associated with the other intake valve 2, and the second rocker arm 33 disposed between the first and third rocker arms 32, 34 are pivotally supported on the rocker shaft 31 in mutually adjacent relation. The first rocker arm 32 has on its upper surface a cam slipper 36 held in slidable contact with one of the low-speed cams 29. The second rocker arm 33 has on its upper surface a cam slipper 39 held in slidable contact with the high-speed cam 30. The third rocker arm 34 has on its upper surface a cam slipper 38 held in slidable contact with the other low-speed cam 29.

Flanges 39 are attached to the upper ends of the intake valves 2, respectively. The intake valves 2 are normally urged in a closing direction, i.e., upwardly, by valve springs 40 disposed between the flanges 39 and the engine body E. Tappet screws 41 are adjustably threaded through the first and third rocker arms 32, 34 so as to be engageable with the upper side of the intake valves 2.

The second rocker arm 33 is normally resiliently biased in a direction to be slidably held against the high-speed cam 30 by a resilient urging means 42 disposed between the second rocker arm 33 and the engine body E. The resilient urging means 42 comprises a bottomed cylindrical lifter 43 held against the second rocker arm 33 and a lifter spring 44 interposed between the lifter 43 and the engine body E, the lifter 43 being slidably fitted in a bottomed hole 45 defined in the engine body E.

The valve operation mode changing mechanism 35 comprises a first switching pin 51 for connecting the third and second rocker arms 34, 33, a second switch pin 52 for connecting the second and first rocker arms 33, 32, a third switching pin 53 for limiting movement of the first and second switching pins 51, 52, and a return spring 54 for normally urging the switching pins 51 through 53 in a direction to disconnect the rocker arms 32 through 34.

The third rocker arm 34 has a bottomed guide hole 55 defined therein parallel to the rocker shaft 31 and opening toward the second rocker arm 33. The first switching pin 51 is slidably fitted in the guide hole 55, with a hydraulic pressure chamber 56 being defined between the first switching pin 51 and the closed end of the guide hole 55. A limiting step 57 is defined on an intermediate inner surface of the guide hole 55 and faces toward the open end of the guide hole 55. The first switching pin 51 has an axial length such that when one end thereof engages the limiting step 57, the other end is positioned between the third and second rocker arms 34, 33. The third rocker arm 34 also has a communication passage 58 defined therein in communication with the hydraulic pressure chamber 56. The rocker shaft 31 has a hydraulic pressure supply passage 59 defined therein. The communication passage 58 and the hydraulic pressure supply passage 59 communicate with each other at all times through a communication hole 60 defined in a side wall of the rocker shaft 31 irrespective of how the third rocker arm 34 may be angularly moved.

The second rocker arm 33 has a guide hole 61 defined therein between its opposite sides and extending parallel to the rocker shaft 31, the guide hole 61 having the same diameter as that of the guide hole 55. The second switching pin 52 is slidably fitted in the guide hole 61.

The first rocker arm 32 has a bottomed guide hole 62 defined therein parallel to the rocker shaft 31 and opening toward the second rocker arm 33, the guide hole 62 being of the same diameter as that of the guide hole 61. The third switching pin 53 is slidably fitted in the guide hole 62 with its coaxial shank 63 movably inserted in a guide hole 64 defined in the closed end of the guide hole 62. A return spring 54 is disposed around the shank 63 between the closed end of the guide hole 62 and the third switching pin 53 for normally urging the abutting switching pins 51 through 53 in the direction to disconnect the rocker arms 32 through 34, i.e., toward the hydraulic pressure chamber 56.

When no hydraulic pressure is supplied to the hydraulic pressure chamber 56, the switching pins 51 through 53 are moved in the disconnecting direction under the bias of the return spring 54. In this condition, the abutting surfaces of the first and second switching pins 51, 52 are positioned between the third and second rocker arms 34, 33 and the abutting surfaces of the second and third switching pins 52, 53 are positioned between the second and first rocker arms 33, 32. The rocker arms 32 through 34 are thus disconnected from each other, and the valve operation changing mechanism 35 is in a low-speed mode of operation. Therefore, the intake valves 2 are opened and closed at the timing and lift dependent on the cam profile of the low-speed cams 29, i.e., corresponding to the third rotational speed range A3.

When a hydraulic pressure is supplied to the hydraulic pressure chamber 56, the switching pins 51 through 53 are moved in a direction away from the hydraulic pressure chamber 56 against the resiliency of the return spring 54. The first switching pin 51 is inserted into the guide hole 61, and the second switching pin 52 is inserted into the guide hole 62, thereby interconnecting the rocker arms 32 through 34. The valve operation changing mechanism 35 is in a high-speed mode of operation. Therefore, the intake valves 2 are opened and closed at the timing and lift dependent on the cam profile of the high-speed cam 30, i.e., corresponding to the fourth rotational speed range A4.

Referring back to FIG. 1, a control valve 66 which can be shifted in response to energization and deenergization of a solenoid 65 is connected between a hydraulic passage 67 communicating with the hydraulic pressure passage 59 in the rocker shaft 31, and a hydraulic supply passage 69 connected to a hydraulic pressure supply source 68 such as a hydraulic pressure pump or the like and a hydraulic return passage 71 connected to an oil tank 70. The solenoid 65 is selectively energizable and deenergizable by the control means 25. When the engine rotational speed is in the third rotational speed range A3 below the second rotational speed N2, the solenoid 65 is deenergized and the valve operating mechanism 3 is in the low-speed mode of operation. When the engine rotational speed is in the fourth rotational speed range A4 higher than the second rotational speed N2, the solenoid 65 is energized, and the valve operating mechanism 3 is in the medium/high-speed mode of operation.

Operation of the intake device according to the above embodiment will be described with reference to FIG. 2. In a low-speed range below the first rotational speed HI, both of the on/off valves 21, 22 are closed to cut off the second intake passageway 20, and the valve operating mechanism 3 operates in the low-speed mode. The output torque of the engine at this time is indicated by a broken-line curve a. Since the length and cross-sectional area of the first intake passageway 19 are selected to provide an optimum intake inertia effect in the relatively low first rotational speed range A1, the engine can produce a high output torque. With the on/off valve 22 in the downstream end of the second intake passageway 20 being closed, any dead space created in the downstream end of the second intake passageway 20 is minimized, thereby stabilizing the idling rotational speed of the engine and increasing the response of the engine to quick acceleration from near the idling rotational speed.

In a rotational speed range above the first rotational speed HI and below the second rotational speed N2, the valve operating mechanism 3 operates in the low-speed mode, the on/off valve 21 in the upstream end of the second intake passageway 20 is opened, and the on/off valve 22 in the downstream end thereof remains closed. In this rotational speed range, the volume of the second intake passageway 20 is added to the volume of the intake chamber 7 to vary the natural frequency of the first intake passageway 19, thereby shifting the torque peak as indicated by a broken-line curve b1.

In a rotational speed range from the second rotational speed N2 to the third rotational speed N3, the valve operating mechanism 3 is shifted from the low-speed mode of operation to the medium/high-speed mode of operation. Therefore, the torque peak is displaced as indicated by a broken-line curve b2.

In a rotational speed range higher than the third rotational speed N3 and lower than the fourth rotational speed N4, the valve operating mechanism 3 remains in the medium/high-speed mode of operation, the on/off valve 21 in the upstream end of the second intake passageway 20 is closed, and the on/off valve 22 in the downstream end thereof is opened. The volume of the second intake passageway 20 is now added to the volume of the first intake passageway 19 thereby to vary the natural frequency of the first intake passageway 19, whereupon the torque peak is shifted as indicated by a broken-line curve b3. With the multicylinder internal combustion engine, it is possible to shift the engine rotational speed at which an intake interference is developed.

In a rotational speed range higher than the fourth rotational speed N4, both of the on/off valves 21, 22 are opened to open the second intake passageway 20. The equivalent tube length and cross-sectional area of the combined first and second intake passageways 19, 20 are selected to provide an optimum intake inertia effect above the fourth rotational speed range N4 (i.e. second rotational high-speed range A2), making it possible to produce a high engine output power as indicated by a broken-line curve c.

Accordingly, it is possible to obtain five torque peaks indicated by curves a, b1, b2, b3, c in the entire range of engine rotational speeds. As a result, the engine can produce an output torque represented by combining these torque peaks as indicated by the solid-line curve in FIG. 2, and hence generate a high output power in a wide rotational speed range.

Figure 6:
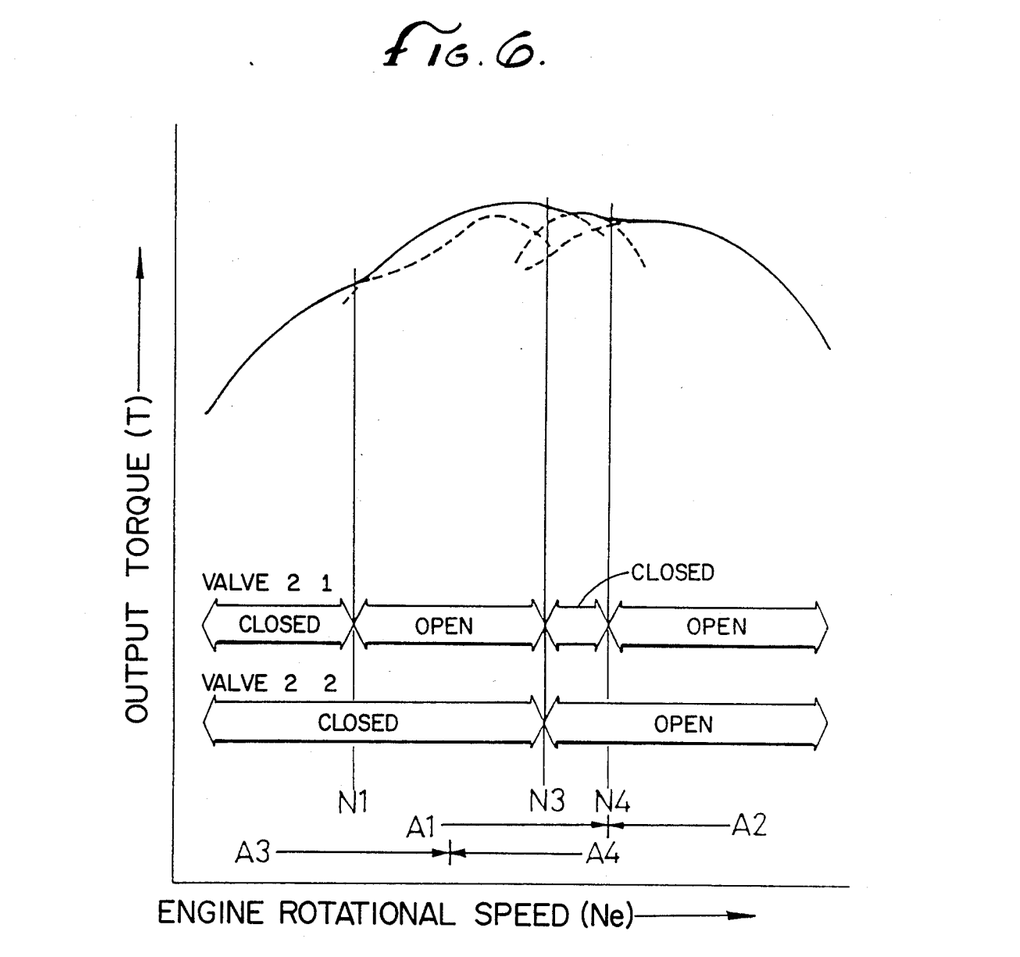
FIGS. 6 and 7 are graphs showing output torque characteristics according to other operating modes of the present invention.

FIG. 6 shows operation modes and a combined torque curve produced by controlling the intake according to another mode of operation of the present invention. Even if the valve operating mechanism 3 operates in a fixed mode irrespective of the engine rotational speed, it is possible to produce four torque peaks by controlling the timing of operation of the on/off valves 21, 22 and hence to generate a high output power in a wide rotational speed range. By closing the on/off valve 22 in a low-speed range, the idling speed can be stabilized and the response to quick acceleration can be increased as with the preceding embodiment.

Figure 7:
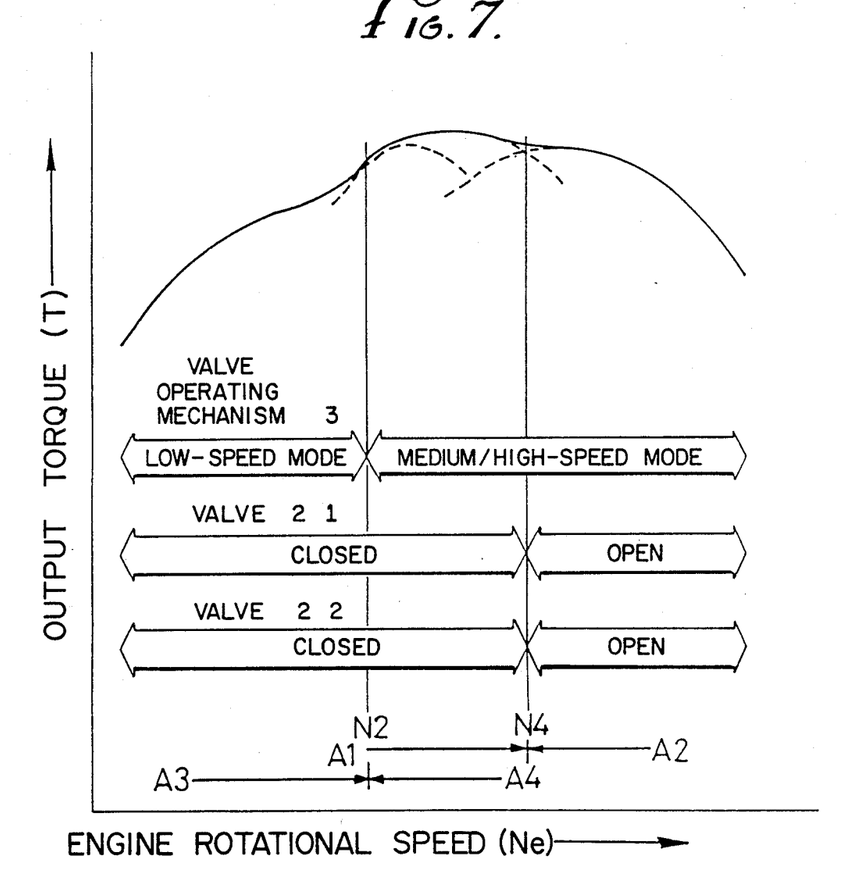

FIG. 7 illustrates operation modes and a combined torque produced by controlling the intake in accordance with still another mode of operation of the present invention. According to this embodiment, three torque peaks can be produced by only opening both of the on/off valves 21, 22 when the engine rotational speed exceeds the fourth rotational speed N4 and also by switching the valve operating mechanism 3 from the low-speed mode of operation to the medium/high-speed mode of operation when the engine rotational speed goes higher than the second rotational speed N2. Therefore, a high engine output power can be obtained in a wide rotational speed range by combining the three torque peaks thus produced. Since the on/off valve 22 is closed in a low-speed range, the idling rotational speed can be stabilized and the response to quick acceleration can be increased, as with the previous embodiments.

According to a first feature of the present invention, the selectively openable and closable on/off valves are disposed in the upstream and downstream ends, respectively, of the second intake passageway. By closing the on/off valve in the downstream end of the second intake passageway in a low-speed range, any dead space in the second intake passageway is minimized, and the intake stability in the low-speed range and the response to quick acceleration from the low-speed range are increased.

According to a second feature of the present invention, the on/off valves in the second intake passageway are openable and closable independently of each other. By opening and closing the on/off valves at different timings, more torque peaks can be produced by the engine than possible with the conventional intake device for a high engine output power in a wide range of engine rotational speeds.

According to a third feature of the present invention, the valve operating mechanism is selectively operable in a mode corresponding to the third rotational speed range which is a low-speed range and different from the first rotational speed range, and a mode corresponding to the fourth rotational speed range higher than the third rotational speed range and different from the second rotational speed range. Therefore, by controlling the timings of opening and closing the on/off valves in the second intake passageway and the timing of switching the valve operating mechanism in combination, more torque peaks can be produced by the engine for a greater engine output power in a wider range of engine rotational speeds, as shown in FIG. 2.

I claim:

1. An intake manifold device for an internal combustion engine including a first intake passageway having a length and a cross-sectional area effective for a low-speed range of the engine, and a second intake passageway having selective valve means for high-speed range operation of the engine, said valve means including at least two openable and closable valves disposed respectively in upstream and downstream ends of said second intake passageway.

2. A device according to claim 1, wherein said valves in said second intake passageway are openable and closable independently of each other.

3. A device according to claim 1 or 2, wherein an intake valve operating mechanism is selectively operable in a low-speed mode corresponding to a third rotational speed range which is a low-speed range different from the first rotational low-speed range in which the second intake passageway is closed by said valve means and in a high-speed mode corresponding to a fourth rotational speed range higher than the third rotational speed range different from the second rotational high-speed range in which the second intake passageway is opened by said valve means.

4. A device according to claim 3, wherein said first rotational speed range extends to a higher rotational speed than said third rotational speed.

5. A device according to claim 3, wherein said valve located in the upstream end of said second intake passageway is opened for a speed range that overlaps the third and fourth rotational speed ranges but does not include all of either said third or fourth rotational speed ranges.

6. A device according to claim 5, wherein said first rotational speed range extends to a higher rotational speed than said third rotational speed.

7. A device according to claim 2, wherein said valve located in the upstream end of said second intake passageway is closed in a very low-speed range, opened in an intermediate speed range higher than said very low-speed range, closed in medium-speed range higher than said intermediate speed range, and opened in a high-speed range higher than said medium-speed range.

8. A device according to claim 7, wherein said valve located in the downstream end of said second intake passageway is closed in said very low-speed and intermediate-speed ranges and opened in said medium-speed and high-speed ranges.

9. A device according to claim 1, wherein said second intake passageway merges into said first intake passageway upstream of the location of an intake port to the engine, said valve located at the downstream end of said second intake passageway being of a shape and at a location to minimize any space that is discontinuous from the cross-sectional area of the first intake passageway when said valve is closed.

10. A device according to claim 1, 2, 7, 8 or 9, wherein a control means having means for detecting engine rotational speed is provided for operating said valves between open and closed positions at predetermined rotational speeds.

11. An intake device in an internal combustion engine including an engine body having an intake port connected to an intake valve port which is openable and closable by an intake valve operatively coupled to a valve operating mechanism, the intake port being connected to an intake chamber through a first intake passageway which has a length and a cross-sectional area that are selected for a first rotational speed range of the engine which is a low-speed range and also through a selectively openable and closable second intake passageway which is openable in a second rotational speed range of the engine which is a high-speed range, the improvement comprising, openable and closable on/off valves disposed respectively in upstream and downstream ends of said second intake passageway.

12. An intake device according to claim 11, wherein said on/off valves in said second intake passageway are openable and closable independently of each other.

13. An intake device according to claim 11 or 12, wherein said valve operating mechanism is selectively operable in a mode corresponding to a third rotational speed range which is a low-speed range and different from the first rotational speed range and in a mode corresponding to a fourth rotational speed range higher than the third rotational speed range and different from the second rotational speed range.

* * * * *